Oct. 20, 1936.  H. PELPHREY  2,057,970
LEAD CHECKING DEVICE FOR GLOBOIDAL WORMS
Filed April 2, 1936  4 Sheets-Sheet 1

Patented Oct. 20, 1936

2,057,970

UNITED STATES PATENT OFFICE 2,057,970

LEAD CHECKING DEVICE FOR GLOBOIDAL WORMS

Harry Pelphrey, Detroit, Mich., assignor to Michigan Tool Company, a corporation of Delaware Application April 2, 1936, Serial No. 72,238

21 Claims. (Cl. 33—174)

The present invention relates to testing mechanism for gears, and in particular, provides an improved device for accurately checking the lead, pressure angle, and tooth spacing of worms of the globoidal or Hindley type.

Objects of the present invention are to provide a gear checking device of the just stated type; to provide such a device embodying means to move a worm and a checking instrument in timed relation, the checking instrument being effective to record or to respond to variations from a selected value of the lead, pressure angle, or the tooth spacing; to provide such a device embodying a finger corresponding to one tooth of a worm wheel of mating capacity with the worm to be tested, and embodying means to move the finger in a circular path concentric with the axis of such worm wheel, in timed relation to the rotation of the worm; to provide such a device in which the finger is pivotally supported and adapted to bear against a tooth face of the worm, and having recording mechanism associated therewith, adapted to respond to a pivoting of the finger about its pivotal axis as influenced by variations in the lead, pressure angle, or tooth spacing of the worm; to provide such a machine in which the finger coincides with a line representing an extension of a worm tooth face; and to provide such a device in which a movement of said finger from said coinciding position, as influenced by variations from a desired value in the pressure angle, lead or tooth spacing, results in an indication as to the character and magnitude of such variation.

Further objects of the present invention are to provide a checking device of the general character above stated, and embodying means to vary the center distance between the worm and the checking instrument in order to accommodate the device to worms of different sizes and in order to permit ready checking of the pressure angle of a worm; to provide such a device in which the finger is supported upon a table which is mounted upon a rotatable support and is movable transversely of said support; and to provide such a device embodying driving means common to the worm and to the checking device in order to effect movement thereof in correspondence with each other.

Further objects of the present invention are to provide a gear checking device of the general character above stated, which is selectively adjustable to accommodate gears of different leads and pressure angles; to provide a device in which the radial spacing between the finger and its center of bodily rotation is selectively and accurately adjustable; and to provide such an arrangement embodying improved mechanism to effect the radial adjustment of the finger.

Further objects of the present invention are to provide a gear checking device embodying means to index a worm and a checking instrument in timed relation, in which the indexing means are individual to the worm and to the checking instrument respectively; in which means are provided to change the relative rotative positions of the worm and of the indexing device, and of the checking finger and the worm; in which the means for indexing the worm and the checking device include toothed discs, and detent mechanism associated therewith to effect predetermined angular advances of each disc; to provide such a device in which one of the indexing devices includes a plurality of spaced pins, and detent mechanism associated therewith and retractable to permit advance of the associated member past a selected number of such pins corresponding to a desired angular advance thereof; and to provide such a device including means to effect a continuous advance of one of the members and having cooperating means to accurately record the angular advance so effected.

With the above and other objects in view, which appear in the following description and in the appended claims, various preferred embodiments of the present invention are shown in the accompanying drawings, throughout which corresponding reference characters are used to designate corresponding parts and in which:

Worm gears of the globoidal or Hindley type, to which the present invention particularly relates, are characterized in that lines drawn, in a plane of the axis of the worm, as extensions in such plane of the tooth faces of the worm, are all tangent to a circle, which may for convenience be called the base circle of the worm, and which is concentric with the axis of a worm wheel of mating capacity with the worm and positioned in mating relation thereto. For each worm, the spacing between the center of the base circle thereof and the axis of the worm is determined primarily by the radius of the worm wheel with which the worm is designed to mate, and the radius of the base circle is determined by the pressure angle of the teeth of the worm.

The tangential relation between lines representing extensions of the tooth faces and the base circle of the worm, as above generally stated, is utilized in the gear checking construction of the present invention, although, as will appear from a complete understanding of the present invention, certain of the features and advantages thereof are useful in connection with the checking of gears of other than the globoidal type, and may be practiced in constructions not primarily based upon the just stated principle.

Figures 1, 2:
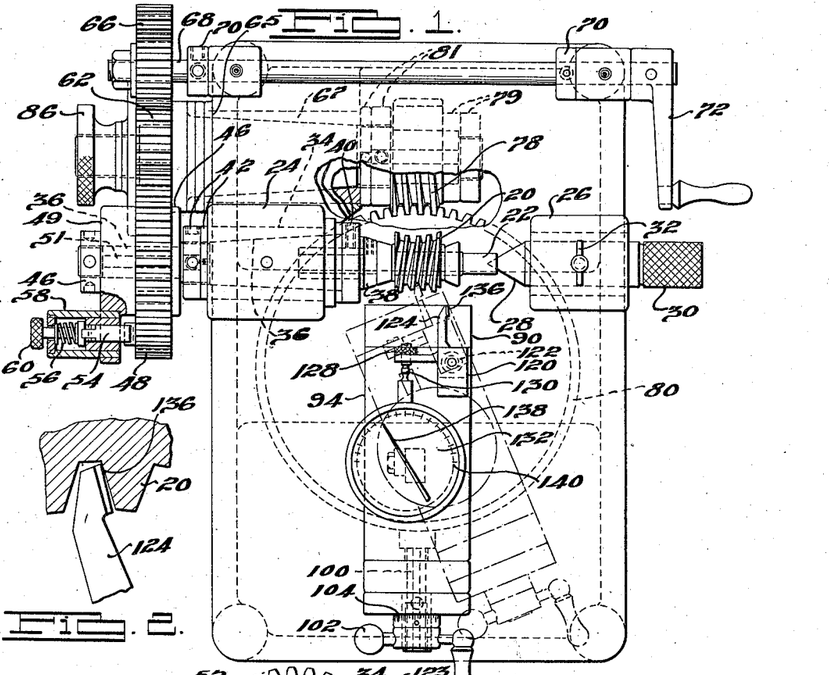
Fig. 1 is a view in top plan of one embodiment of the present invention.
Fig. 2 is a detail view illustrating a preferred face structure of the checking finger of the mechanism shown in Fig. 1.
Figure 3:
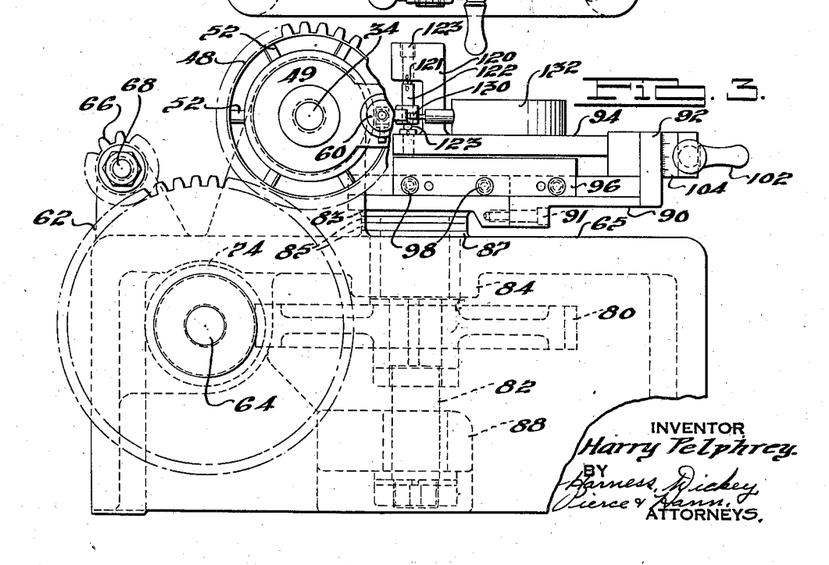
Figure 3 is a view in side elevation of the structure shown in Fig. 1.

Considering now the various preferred constructions in detail, and referring first to Figures 1, 2, and 3, the worm 20 to be checked is supported upon an arbor 22, which in turn is rotatably supported between head and tail stocks 24 and 26, respectively, which may be of generally conventional construction. Stock 26 is provided with a dead center 28 which is retractable by the knurled hand nut 30 to permit the removal and insertion of arbor 22, and may be locked in place by a conventional locking device 32. The head stock 24 is provided with a tapered bearing sleeve 34, which rotatably receives a shaft 36, the end of which is recessed to receive the driving chuck 38. Shaft 36 is axially fixed in head stock 24 by the collars 40 and 42 respectively and on its outer end also carries an additional pair of collars 46, between which a driving gear 48 and a driving hub 49 are disposed. Hub 49 is keyed by key 51 to shaft 36, and gear 48 is freely rotatable thereon. The outer face of gear 48 is provided with a plurality of radially extending ribs 52, which cooperate with a spring pressed detent 54 to provide a driving relation between gear 48 and hub 49, in any one of a plurality of rotative positions therebetween, corresponding in number and position to the ribs 52. As described in more detail hereinafter, the just mentioned arrangement is provided to effect a rough adjustment of the relative rotative positions of the worm 20 and of the checking mechanism. Detent 54 and the compression spring 56 associated therewith to urge it into engagement with one of the ribs 52, are disposed within a housing 58 secured upon the hub 49. A retracting handle 60 is provided to retract the detent 54 against the force of spring 56, and permit free relative rotation between hub 49 and gear 48.

Gear 48 is in continuous meshing relation to a larger gear 62, which is carried upon a shaft 64 which is suitably journaled in a tapered bearing 67 in the machine frame 65, and which in turn meshes with a smaller driving pinion 66, supported upon and for rotation by a shaft 68. The shaft 68 extends transversely of the machine frame 65, being journaled in bearing bosses 70 formed thereon and at its right hand end, as viewed in Fig. 1, is provided with a manually operable crank 72, which represents a suitable source of driving power for the machine.

The shaft 64 upon which the gear 62 is mounted extends inwardly of the machine, and at its inner end is provided with a suitable worm 78, which is secured in place axially thereof between collars 79 and 81. Worm 78 is in driving relation to a gear 80, the shaft 82 of which is journaled at its upper end in a boss 84 which is formed in the frame 65, and at its lower end is journaled in a corresponding boss 88 forming part of or secured to the machine frame. Shaft 64 thus acts to drive the checking instrument, in response to rotation of crank 72. The outer end of shaft 64 is provided with a knurled head 86, by which, upon release of detent 54, it may be rotated to effect desired adjustments of the relative rotative positions of worm 20 and the checking mechanism.

Instrument table 90 is either formed integrally with or suitably secured upon the upper end of shaft 82, above the level of the machine frame. A machined boss 83 formed on the underside of table 90 rests upon thrust washers 85, which in turn bears upon a boss 87 extending slightly above the machine frame, thus supporting table 90 in accurately elevated position relative to the axis of the worm 20, and with the axis of shaft 82 directly opposite the axial center of worm 20.

The table 90 is illustrated as generally rectangular in shape, formed in two parts, secured together by studs 91, and having at its right hand end, as viewed in Fig. 3, an upstanding projection 92. The instrument and finger-carrying slide 94 is suitably guided for movement longitudinally of table 90 between ways 96 which are secured to table 90 at opposite sides thereof by studs 98. A suitable lead screw 100 extends through the projection 92 and is conventionally threaded into slide 94, so that rotation of the former, as by the handle 102, causes slide 94 to move along table 90. Preferably, and as illustrated, a scale 104 is provided, which moves with handle 100, and projection 92 may be provided with a cooperating washer, to afford an accurate indication of the movement of slide 94.

Adjacent the left-hand end of slide 94, as viewed in Fig. 3, a boss 120 extends upwardly and forms a support for a needle bearing 121, between which and a similar lower needle bearing 123, a finger carrying trunnion 122 is pivoted. The finger 124, which is suitably secured to trunnion 122, is of bell crank shape, one arm thereof being provided with an adjustably secured stop 128 for cooperation with the operating element 130 of extensometer 132. The other arm of finger 124 is provided with a rearwardly relieved face 136, adapted to have a point contact with a tooth face of the worm 20 to be checked.

Extensometer 132 which may be of conventional construction, is suitably secured upon the upper surface of slide 94 and includes the recording pointer 138 which responds to the inward and outward movements of the operating element 130, which element is spring biased to an outward position relative to the extensometer structure. In accordance with conventional practice, extensometer 132 may be provided with a reading scale 140 which is rotatable with respect to the body of the extensometer and which, therefore, may be set to provide a zero extensometer reading corresponding to any selected inward or outward position of the operating element 130. As will be further understood, the zero reading selected for operating purposes is usually one in which the biasing spring associated with the operating member 130 is under compression so that if the element engaged by the operating member 130 is retracted, member 130 follows it, providing an extensometer reading on one side of the zero point and if the element engaged by the operating member is moved to force the operating member inwardly of the extensometer, a reading is provided on the opposite side of the zero point. In the illustrated arrangement, accordingly, the operating member 130 of extensometer 132 continuously engages the stop 126 associated with finger 124, urging it about its trunnion 122 and urging the face 136 into continuous engagement with a tooth face of worm 20.

As previously stated, worms of the globoidal or Hindley type, for which the illustrated construction of checking device is particularly designed, are characterized in that extensions of the tooth faces, drawn in the plane of the axis on the worm, are tangential to a circle concentric with the axis of a worm wheel of mating capacity with the worm, and which may be called the base circle. Accordingly, in the axis of trunnion 122, about which finger 124 pivots, lies on the base circle of worm 20, and an imaginary line drawn from the point of contact between the face 136 of finger 124 and a tooth face of an accurately formed worm 20 to the axis of rotation of finger 124, corresponds to such a tooth face extension. In constructing the machine, the spacing between the axis of shaft 92, about which table 90 and the structure supported thereby bodily rotates, and the axis of pin 122, about which finger 124 rotates, is made to conform very accurately to the radius of such so-called base circle of the worm. Stated in another way, finger 124 is supported for bodily rotation about the axis of shaft 82, which coincides with the center of an imaginary worm wheel adapted for and positioned in mating relation to worm 20, and thus corresponds to one tooth of such imaginary worm wheel.

Considering now the operation as a whole of the above described elements, it will be understood that when the machine is not in use, the table 90 and slide 94 may occupy the central full line position shown in Fig. 1, in which the checking finger 124 is withdrawn out of cooperative relation to the worm 20. As previously stated, the worm 20 is so adjusted upon arbor 22 between head and tail stocks 24 and 26, that the axial center thereof is directly opposite the center of rotation of slide 94, that is, directly opposite the axis of shaft 82. In adjusting worm 20 upon arbor 22, it is not necessary to place it in any particular rotative position relative to the driving mechanism, or to the checking finger 124. After locating worm 20, handle 102 may be suitably rotated to advance checking finger 124 to the left, as viewed in Fig. 3, bringing it to a point where the face 136 thereof falls between a crown and root of worm 20. With the parts in the full line relation shown in Fig. 1, such advance of finger 124 brings it to the right of the end of worm 20, and as a preliminary to such advance, therefore, detent 54 may be retracted, disconnecting hub 49 and gear 48, and permitting independent rotation of gear 80 and consequently finger 124, by either the knurled nut 86, or the operating crank 72. This rotation may be continued sufficiently to bring finger 124 between two successive turns of worm 20. Continued independent rotation of gear 80 and finger 124, after advancing finger 124 as stated above to a position where the face 136 thereof lies between a crown and root of worm 20, ultimately brings face 136 into engagement with a tooth face of worm 20. Preferably, the independent rotation is continued far enough to cause some pivoting of finger 124 about the axis of trunnion 122, which pivoting movement is transmitted to the operating member 130 of extensometer 132 and forces member 130 inwardly of the latter, compressing the spring mechanism thereof and resulting in a dial movement thereof.

If detent 54 is now released into a position opposite one of the ribs 52 associated with gear 48, and it being assumed that detent 54 is directly bearing against one of such ribs, it will be understood that continued movement of crank 72, or the knurled head 86, results in simultaneous rotation of worm 20 and of the finger carrying slide 94, it being further understood of course that the gearing is such that rotation of slide 94 in a counter clockwise direction, as viewed in Fig. 1, is accompanied by rotation of worm 20 in a direction to cause counter clockwise rotation of a worm wheel located similarly to slide 94. The initial simultaneous movement of worm 20 and slide 94 absorbs any backlash which may exist between the members and the driving elements thereof, so that continued such simultaneous movement occurs in accurate, synchronous relation. Upon such initial backlash absorbing movement, the reading scale 140 associated with extensometer 132 may be rotated bodily about the extensometer to bring the zero reading thereof directly opposite the pointer 138.

The gear ratios of the machines are such that slide 94 rotates at a rate relative to the rate of rotation of worm 20 equal to the rate at which a worm wheel of mating capacity with worm 20 would rotate, so that, if the lead of worm 20 is accurate, the continued simultaneous advance of worm 20 and slide 94 will not result in any rotation of finger 124 about the axis of its supporting trunnion 122. If an inaccuracy or irregularity in the lead of worm 20 occurs at any point along its length, however, the worm tooth face at the point of such irregularity will tend to either advance ahead of, or fall behind, slide 94, and will either force a pivotal movement of finger 124 about its pivotal axis or will permit an opposite rotation thereof about its pivotal axis under the influence of the spring mechanism associated with the extensometer. The irregularity, therefore, will appear as a fluctuation in the position of the pointer 138 of extensometer 132, which instrument will indicate both the degree and direction of the irregularity.

It will be noted that the machine may be operated in either direction, in checking a particular tooth face. During rotation in one direction, the worm 20 tends to force the finger 124 along, and during rotation in the other direction, the tooth face of worm 20 by receding, tends to permit the finger 124 to follow the tooth face under the influence of the spring mechanism associated with the extensometer.

The illustrated finger construction is arranged to check a single tooth face at a time, it being understood that the illustrated finger 124 checks the left hand tooth face of the worm 20. It will be understood, however, that for checking the right hand face of worm 20, a similarly constructed finger may be utilized, having an oppositely directed face, the checking finger being readily insertable and removable, upon removal of set screw 123 associated with trunnion 122.

As previously stated, the tooth face 136 of the checking finger 124 is relieved rearwardly, so that a point of contact is provided between finger 124 and worm 20. Accordingly, the present construction may be used to afford an accurate check of the pressure angle of worm 20. In doing this, the machine may be brought to rest with finger 124 in engagement with a tooth face of worm 20 at any desired point on the helical path thereof, a zero reading determined, and slide 94 may then be moved longitudinally of the table 90 by member 102, which movement serves to advance finger 124 back and forth across the tooth face between the crown and the root thereof. If the pressure angle of the tooth face at the point being checked is accurate, it will be understood that the just mentioned movements will not result in any pivotal movement of finger 124 about the axis of trunnion 122, and will consequently have no effect on the position of the extensometer pointer. Any irregularity in the pressure angle will result in a pivotal movement of finger 124, which pivotal movement will be communicated to and indicated upon extensometer 130 both as to degree and as to direction.

The embodiment shown in Figs. 4 through 8 operates on practically the same principles as those upon which the above described embodiment operates, but is distinguished from such first embodiment in that it is of a so-called universal type, being selectively adjustable to operate upon worms of any desired lead or pressure angle.

Considering Figs. 4 through 8 in detail, the worm 150 to be checked is supported on an arbor 152 between stocks 154 and 156. The dead center 158, which rotatably supports one end of arbor 152, fits within a tapered chuck 151, which in turn is slidable within an adjusting sleeve 153. Sleeve 153 is adjustable within a bushing 155 fitted into stock 156. An adjusting rod 157 passes through sleeve 153, one end of which is threaded into chuck 151, and the other end of which carries an adjusting nut 159. Rotation of nut 159 either positively moves center 158 to the right, as viewed in Fig. 7, or permits it to be moved to the left under the influence of compression spring 160, which is seated between the end of chuck 151 and a shoulder formed in sleeve 153. Sleeve 153 may be locked in any desired position of adjustment axially of bushing 155 by locking stud 161, the cap nut 162 of which may be turned down to force a pair of locking blocks 164 into jamming relation to chuck 151. The live center 165 is supported within a bore formed in shaft 166, which is axially fixed, by lock nuts 169, within an adjusting sleeve 167. One face of sleeve 167, which is non-rotatively secured in stock 154, is provided with rack teeth 168, which cooperate with a rack pinion 169 secured upon a shaft 170 journaled in stock 154. Rotation of pinion 169, as by handle 171, effects a corresponding axial adjustment of shaft 166 and center 165 within stock 154. Cap nut 172 is provided to lock the assembly in a desired position of adjustment.

In practice, an adjustment of centers 158 and 165 may be made by backing off lock nuts 162 and 172, effecting an approximate adjustment of center 158 by moving sleeve 153 and/or turning nut 159 sufficiently to bring center 158 slightly to the left of a desired final position and by rotating handle 171 bringing center 165 to a final position in which the axial center of worm 150 is directly opposite the center of rotation of the checking mechanism, later described. The final movements of center 165 may force center 158 to the right somewhat, as viewed in Fig. 7, this movement being absorbed by spring 160. Upon completing the adjustments, which may thus be readily made after only a single rough setting of center 158, the lock nuts 162 and 172 may again be turned down to locking positions. In inserting and removing worms, center 165 may be left locked, and center momentarily retracted by nut 159 against the force of spring 160.

Figures 7, 8:
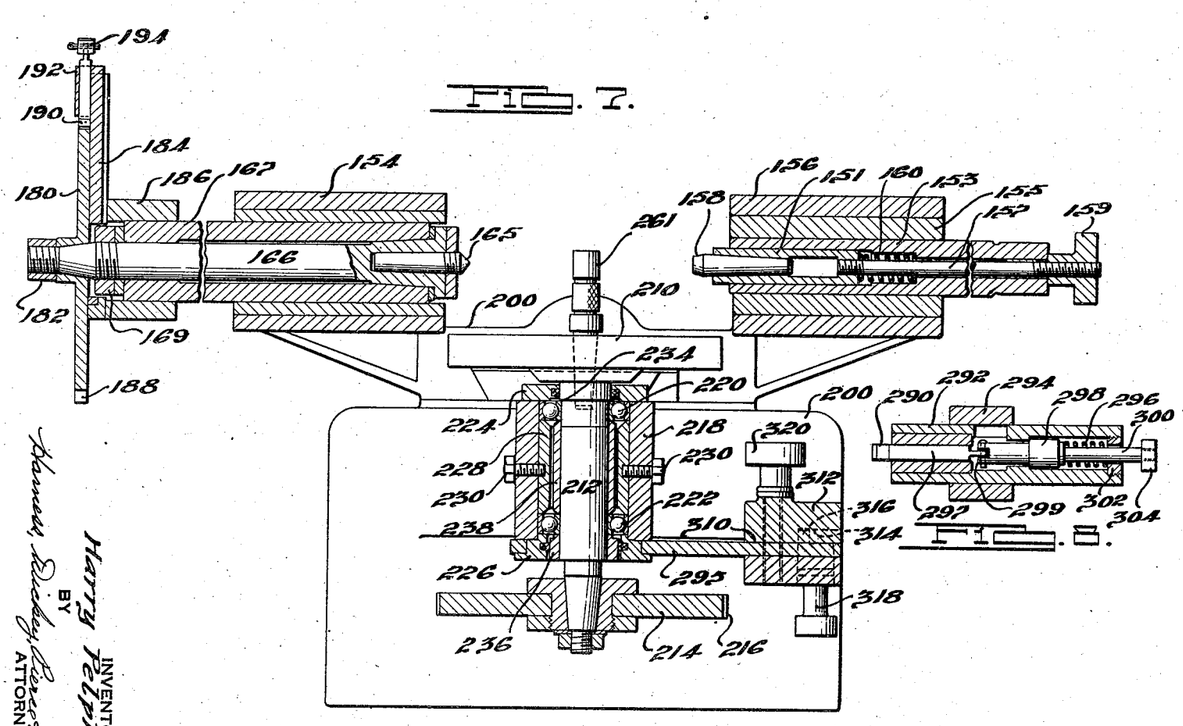
Figure 7 is a sectional view in side elevation corresponding in general to Fig. 4, but having certain of the elements of Fig. 4 omitted therefrom.
Figure 8 is a detail view in vertical section, taken along the line 8—8 of Fig. 4.

The shaft 166 carries, on its outer end, an indexing plate 180, held in place thereon by a lock nut 182, and the right-hand face of which, as viewed in Fig. 7, abuts a bracket 184, the hub 186 of which is fitted over the previously described non-rotative sleeve 167. The periphery of indexing wheel 180 is provided with a plurality of regularly angularly spaced teeth 188 for cooperation with a detent 190, slidably mounted in a boss 192, formed in the bracket 184. Detent 190 is provided with a hand grip 194, by which it may be conveniently moved radially outwardly out of engagement with the teeth 188, to permit rotation of index wheel 180 and consequently shaft 166 and worm 150. The number of the teeth 188 passed over during such rotation serves as an accurate measure of the extent of the rotation thus imparted to the worm 150.

The head and tail stocks 154 and 156, respectively, are illustrated as formed integrally with a slide 200, which rides in suitable ways formed in a bed plate 202, and movement thereof along which may be effected by a conventional lead screw 204, provided with a manually operable hand wheel 206.

The mechanism for carrying the checking finger 208 comprises a table 210, secured at the upper end of a vertically disposed shaft 212, the lower end of which is provided with an indexing wheel 214 which corresponds in all respects to the previously mentioned indexing wheel 180, except that a substantially greater number of ratchet teeth 216 are provided upon the periphery thereof.

Shaft 212 is rotatably supported in a boss 218, which may form part of the machine frame, between ball bearing units 220 and 222. The outer rings of ball bearing units 220 and 222 are secured in desired axial relation relative to the boss 218, between an upper collar 224 and lower collar 226, both of which are suitably secured to boss 218, and a spacing sleeve 228 secured in place relative to boss 218 by studs 230. The inner ball bearing rings are maintained in proper axial relation to shaft 212 by shoulder 234 on shaft 212, collar 236 and an inner sleeve 238. The assembly comprising table 210 and indexing wheel 214 is thus maintained accurately at a desired elevation relative to the axis of rotation of worm 150.

The checking finger 208 is pivotally mounted by a pin 242 upon a slide 244, which rides in suitable ways upon a bed plate 246, and is adjustable longitudinally thereof by a conventional lead screw 248 having a hand wheel 250. Bed plate 246 is adjustably supported upon table 210 by studs 252 and 254, which pass through elongate slots 256 and 258 formed in a bar 260, and through lugs 253 and 255 which ride in lateral slots formed in table plate 246. The nuts (not shown) associated with studs 252 and 254 are disposed in a circular T slot 262, formed in the upper surface of table 210, and concentric with the axis of rotation thereof. As will be understood, by backing off studs 252 and 254, bar 260 and table 246 may be moved radially inwardly or outwardly of table 210, and may also be adjusted to any desired extent around the circumference of table 210. By tightening studs 252 and 254, lugs 253 and 255 and bar 260 are locked, both to bed plate 246 and to table 210.

Preferably, and as illustrated, a stud 261 is secured to table 210 at the center thereof and which is of known and accurate radius. With this arrangement, convenient settings of the bed plate 246 are obtainable by inserting a bar or object also of known width between the pin 261 and the bar 260.

As described with reference to the first embodiment, the center of rotation of table 210 coincides with the center of the base circle of the worm 150 to be checked, and consequently, the just described radial adjustment of bed plate 246 with reference to table 210 serves to vary the radius of the base circle.

As in the first described embodiment, the slide 244 carries an extensometer 264, which may correspond in all respects to the previously described extensometer 132, and which may be correspondingly associated with the checking fingers 208. A somewhat different arrangement is shown, in which the operating member 266 of extensometer 264 bears against a push rod 268, slidably mounted within a boss 270 secured upon slide 244. The outer end of rod 268 bears against one end of a short link 272, pivotally mounted by a pin 274 upon an extension 276 of slide 244. An adjustable stop 278 associated with finger 208 bears against the link 272 at a point intermediate its length. With this arrangement, it will be understood that pivotal movement of finger 208 about its mounting pin 242 causes corresponding pivotal movement of link 272 about its pivot 274, which is transmitted to the extensometer 264 through push rod 268.

Figures 4, 5, 6:
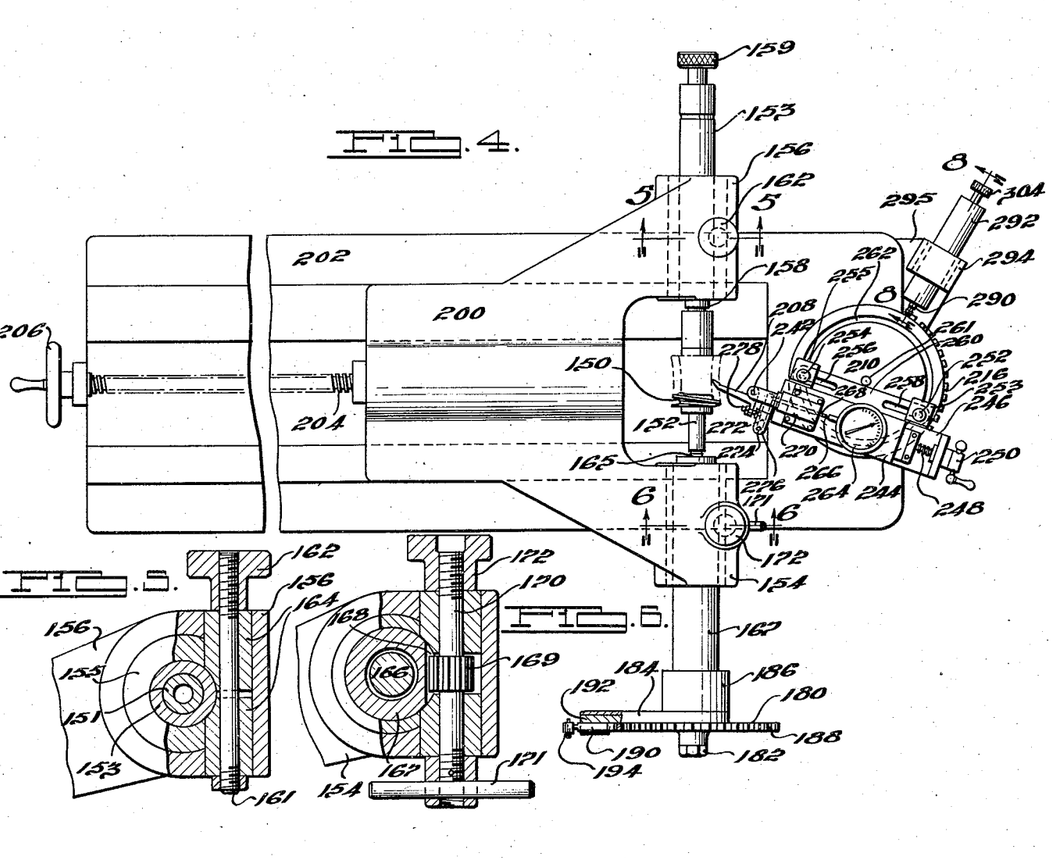
Figure 4 is a top plan view of a modified embodiment of the present invention.
Figure 5 is a detail view in vertical section, taken along the line 5—5 of Fig. 4.
Figure 6 is a detail view in vertical section, taken along the line 6—6 of Fig. 4.

The detent 290, which controls the indexing plate 214, is mounted in a sleeve 292, which, in turn, is suitably secured in a boss 294 formed integrally with an adjusting plate 295. (Fig. 4.) A compression spring 296 seated between an enlarged portion 298 secured upon the shank 300 of detent 290 and the other end of which is seated against a plug 302, which encloses the end of sleeve 292, urges detent 290 to the left as viewed in Fig. 8, to a position in which it is effective to enter between adjacent teeth of indexing wheel 214 and lock the latter against rotation. A head 304 is provided to retract detent 290 against the force of spring 296, thus releasing indexing wheel 214 for rotation.

Detent 290 is formed at the end of an arm 297 pivoted to shank 300 by a removable pin 299, to facilitate replacements thereof, it being desirable to vary the proportions of the detent 290 in accordance with the number of teeth of the index wheel 214, which is also replaceable. It is found also that the articulated construction provides freer and more positive detent movements.

In order to effect an adjustment of the rotative position of finger 208 relative to worm 150 of lesser angular value than the angular spacing between adjacent teeth on the periphery of indexing wheel 214, provision is made for bodily rotating detent 290 relative to indexing wheel 214. For this purpose, the supporting plate 295, for detent 290, is freely rotatable about the previously mentioned collar 226, which affords a vertical support for plate 295, and is thus rotatable about the axis of wheel 214. The right hand end of plate 295, as viewed in Fig. 7, enters a transverse slot 310 formed in a boss 312, which may be suitably secured to or formed integrally with the machine frame; and which is also provided with a longitudinally extending slot 314, within which the eccentric 316 is movable. Eccentric 316 is carried upon the shank of an adjusting stud 318. A locking stud 320 is provided to lock plate 295 in a desired position with reference to boss 312, by clamping the upper and lower jaw portions of the latter together. It will be understood that by releasing locking stud 320, and rotating stud 318, the movement of eccentric 316 effects corresponding rotative movement of plate 295 about the axis of shaft 212 as a center.

The operation of the just described embodiment as a whole is substantially as described with reference to the embodiment shown in Figs. 1, 2, and 3, with the exception that in the operation of the just described embodiment, the rotation of worm 150 and of the slide 244 is effected, in individual step by step fashion, by retracting the detents 190 and 290 associated therewith, respectively, and manually turning the indexing wheels 180 and 214 through corresponding angles. The indexing wheels 180 and 214 are provided with appropriate numbers of notches on the periphery thereof, so that corresponding angular advances thereof, depending upon the gear ratio for which the particular worm 150 being checked is designed, may be effected.

As will be appreciated from the foregoing, an adjustment of the machine of Figures 4 through 8 to accommodate it to worms adapted for differing centered distances between the axis of the worm and the axis of the cooperating worm wheel, is effected by moving the slide 200 longitudinally of the bed plate 202, correspondingly increasing or decreasing the distance between the axis of worm 150 and the axis of rotation of the finger carrying slide 244. As previously described also, an adjustment of the machine to accommodate worms having differing base circle radii is made by releasing the locking studs 252 and 254, thus permitting an increase or decrease of the radial distance between slide 244 and the center of rotation of the table 210. Adjustment of the machine to accommodate worms designed for different gear ratios is conveniently made either by utilizing indexing wheels having numbers of ratchet teeth on the peripheries thereof, such that for that different gear ratios, indexing movements may be made past differing numbers of such ratchet teeth, or by providing different sets of indexing wheels, and selectively replacing the indexing wheels depending upon the gear ratio desired. In utilizing different indexing wheels as previously described, it is desirable to also replace the detents associated therewith, in order that each detent may act positively and correspondingly accurately retain the associated indexing wheel against rotation.

Figure 9:
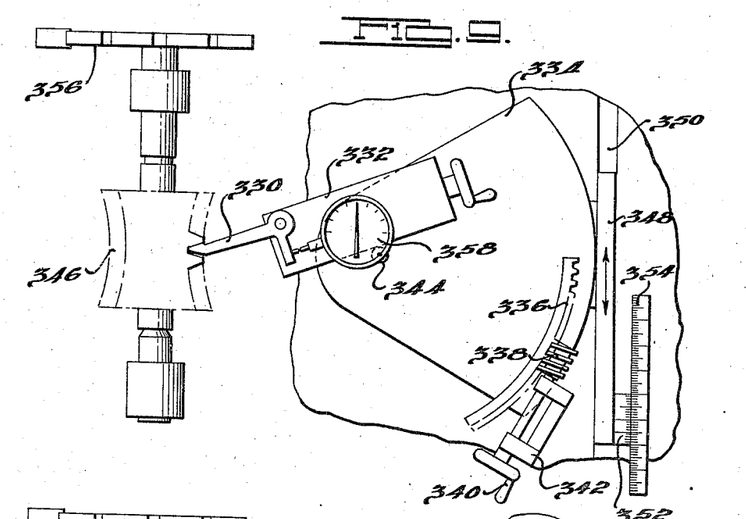
Figure 9 is a partial view illustrating a modified indexing means for the checking instrument.
Figure 10:
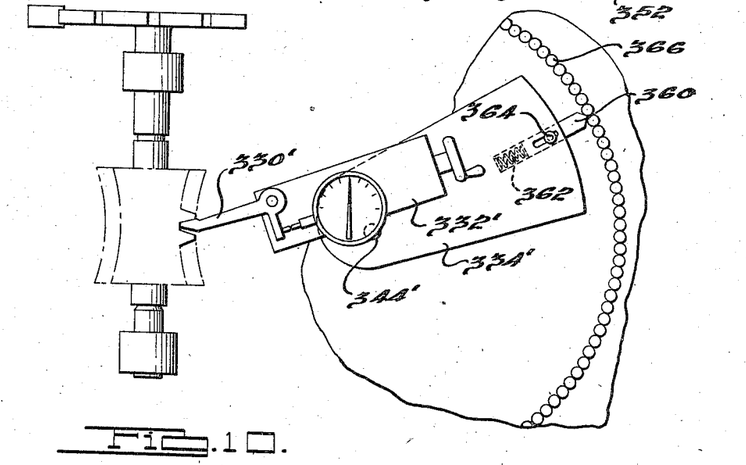
Figure 10 is a fragmentary view illustrating a second modified arrangement for indexing the checking instrument.

Figures 9 and 10 illustrate further modified structures for effecting the indexing of the checking finger. In the arrangement of Figure 9, the checking finger 330 is secured upon a slide 332 in the manner previously described. Slide 332 is suitably adjustably supported upon a segmentally shaped table 334, which carries a segmental rack 336, for cooperation with a suitable lead screw 338 which may be rotated by a hand wheel 340, suitably supported within a stationarily mounted boss 342. It will be understood that rotation of hand wheel 340 effects a corresponding rotation of the segmental table 334 about shaft 344 as a center. As in the previously described embodiment, shaft 344 corresponds to the center of the base circle of the worm 346 being checked. A slide bar 348, slidable within ways 350 formed in the machine frame, engages the periphery of the segmental table 334, and is frictionally moved within ways 350 in response to rotative movement of table 334. Slide 348 also carries a reading scale 352 which cooperates with a stationarily mounted scale 354 to afford an accurate indication of the rotative movement of segmental table 334.

With this arrangement, it will be understood that a predetermined rotative movement of worm 346, as effected by the indexing wheel 356 associated therewith, and which may correspond in all respects to the indexing wheel 180 with reference to Figures 4 to 8, may be accompanied by a corresponding rotative movement of segmental table 334 and checking finger 330, by suitably rotating hand wheel 340, the angular movement of which may be read upon the scales 352 and 254. As in the earlier described modifications, if the worm 346 is accurately formed, the corresponding rotation of finger 330 and worm 346 will not result in any pivotal movement of finger 330 with reference to its slide 332. Any inaccuracy in worm 346, resulting in such a pivotal movement, may be read upon the extensometer 358 in the previously described manner.

In the arrangement of Figure 10, the segmental table 334 is provided with a detent 360, outwardly biased by a compression spring 362, and selectively retractable by a handle 364. Detent 360 cooperates with a series of pins 366, arranged in an arc of a circle concentric with the shaft 344' about which table 334' rotates. It will be understood the pin 366 may be accurately formed so that by notching detent 360 past a desired number thereof a correspondingly accurate angular movement is imparted to table 334' and consequently to the checking finger 330'. In all other respects, as well as in operation, the embodiment shown in Figure 10 may be as described with reference to Figure 9.

Although specific embodiments of the present invention have been described in detail, it will be evident that various changes in the form, number and arrangement of parts may be made within the spirit and scope of the present invention. It will also be evident that various features of the present invention as hereinbefore disclosed, may be used independently of the complete combination described and that the combination may be utilized for purposes other than the specific purposes described. Accordingly, the foregoing is to be considered in an illustrative and not in a limiting sense.

What is claimed is:

1. Checking mechanism for worms comprising in combination, means for rotatably supporting a worm to be checked; a checking element; and means for mounting said checking element for bodily rotation about an axis coincident with the axis of an imaginary worm wheel of mating capacity with and positioned in mating relation to said worm.

2. Checking mechanism for worms comprising in combination, means for rotatably supporting a worm to be checked; a checking element; means for mounting said checking element for bodily rotation about an axis coincident with the axis of an imaginary worm wheel of mating capacity with and positioned in mating relation to said worm; and means for effecting simultaneous and timed rotation of said worm and said checking element.

3. Checking mechanism for worms comprising in combination, means for rotatably supporting a worm to be checked; a checking finger; a table; means pivotally mounting said finger upon said table; and means mounting said table for rotation about an axis coincident with the axis of an imaginary worm wheel of mating capacity with and positioned in mating relation to said worm.

4. Checking mechanism for worms comprising in combination, means for rotatably supporting a worm to be checked; a checking finger; a table; means pivotally mounting said finger upon said table; means rotatably mounting said table for rotation about an axis coincident with the axis of an imaginary worm wheel of mating capacity with and positioned in mating relation to said worm; and means for effecting simultaneous timed rotation of said worm and said table.

5. Checking mechanism for worms comprising in combination, means for rotatably mounting a worm to be checked; a checking finger; and means for pivotally mounting said checking finger for movement into and out of coincidence with a tangent to the base circle of said worm.

6. Checking mechanism for worms comprising in combination, means for rotatably mounting a worm to be checked; a checking finger; means for pivotally mounting said checking finger for movement into and out of coincidence with a tangent to the base circle of said worm; and means for bodily rotating said checking finger about an axis coincident with the axis of said base circle.

7. Checking mechanism for worms comprising in combination, means for rotatably mounting a worm to be checked; a checking finger; means for pivotally mounting said checking finger for movement into and out of coincidence with a tangent to the base circle of said worm; means mounting said supporting means for rotation about an axis coincident with the axis of said base circle; and means for effecting timed rotation of said worm and said supporting means.

8. Checking mechanism for worms comprising in combination, means for rotatably mounting a worm to be checked; a checking finger; supporting means for pivotally mounting said checking finger for movement into and out of coincidence with a tangent to the base circle of said worm; means mounting said supporting means for rotation about an axis coincident with the axis of said base circle; and means for effecting proportional angular rotative movements of said worm and said supporting means.

9. Checking mechanism for worms comprising means for rotatably supporting a worm to be checked; a checking finger; means mounting said checking finger for bodily rotation about an axis coincident with the axis of an imaginary worm wheel of mating capacity with and positioned in mating relation to said worm; and means for adjusting the spacing between said axis and the axis of said worm.

10. Checking mechanism for worms comprising in combination means for rotatably supporting a worm to be checked; a checking finger; means mounting said checking finger in coincidence with a tangent to the base circle of said worm; and means for adjusting said mounting to accommodate said mechanism to worms of differing base circle radii.

11. Checking mechanism for worms comprising in combination, means for rotatably supporting a worm to be checked; an instrument table; means for rotatably mounting said instrument table about an axis coincident with the axis of an imaginary worm wheel of mating capacity with and positioned in mating relation to said worm; a checking finger; means pivotally mounting said checking finger upon said table for movement into and out of coincidence with a tangent to the base circle of said worm; means for effecting proportional rotative advances of said worm and of said table; and indicating mechanism responsive to pivotal movements of said checking finger.

12. Checking mechanism for worms comprising in combination, means for rotatably supporting a worm to be checked; a checking finger; means mounting said checking finger in coincidence with a tangent to the base circle of said worm; and means for adjusting the position of said finger along said tangent.

13. Checking mechanism for worms comprising in combination means for rotatably supporting a worm to be checked; a checking finger; means for mounting said checking finger in engaging relation to a tooth face of said worm and for bodily rotation about an axis coincident with the axis of a worm wheel of mating capacity with and positioned in mating relation to said worm; and means for advancing and retracting said finger along said tooth face between the crown and the root thereof.

14. Checking mechanism for worms comprising in combination means for rotatably supporting said worm; a checking finger; a table for supporting said checking finger for bodily rotation about an axis coincident with the axis of a worm wheel of mating capacity with and positioned in mating relation to said worm; a drive shaft; connections between said worm supporting means and said shaft; additional connections between said table and said shaft; means for releasing one of said connections to effect adjustments of the relative rotative positions of said worm and said table; and means for driving said shaft.

15. Checking mechanism for worms comprising in combination means for rotatably supporting said worm; a checking finger; a table for supporting said checking finger for bodily rotation about an axis coincident with the axis of a worm wheel of mating capacity with and positioned in mating relation to said worm; a shaft associated with said worm supporting means; a shaft associated with said table; an indexing wheel individual to each shaft; and detent mechanism individual to each indexing wheel for locking the associated indexing wheel in selected rotative positions.

16. Checking mechanism for worms comprising in combination means for rotatably supporting said worm; a checking finger; a table for supporting said checking finger for bodily rotation about an axis coincident with the axis of a worm wheel of mating capacity with and positioned in mating relation to said worm; a shaft associated with said worm supporting means; a shaft associated with said table; an indexing wheel individual to each shaft; detent mechanism individual to each indexing wheel for locking the associated indexing wheel in selected rotative positions; and means for bodily moving one of said detent mechanisms relative to its associated wheel to effect an adjustment of the relative rotative positions of said worm and said table.

17. Checking mechanism for worms comprising in combination means for rotatably supporting said worm; a checking finger; means including a table for supporting said checking finger for rotation about an axis coincident with the axis of a worm wheel of mating capacity with and positioned in mating relation to said worm; means for effecting proportionate angular advances of said worm and said checking finger, said advancing means including a lead screw, and indicating means for indicating said angular advance.

18. Checking mechanism for worms comprising in combination means for rotatably supporting said worm; a checking finger; means including a table for supporting said checking finger for rotation about an axis coincident with the axis of a worm wheel of mating capacity with and positioned in mating relation to said worm; mean for effecting proportionate angular advance of said worm and said table, said advancing means including a plurality of pins disposed in spaced relation on an arc of a circle coincident with the axis of rotation of one of said members, and detent mechanism for engagement in the spaces between said pins.

19. Checking mechanism for worms comprising in combination, means for supporting a worm to be checked; a checking element; means for supporting said checking element; and mechanism for causing relative bodily movement between said worm and checking element about an axis coincident with the axis of an imaginary worm wheel of mating capacity with and positioned in mating relation to said worm.

20. Checking mechanism for worms comprising in combination, means for supporting a worm to be checked; a checking element; means for supporting said checking element; mechanism for causing relative bodily movement between said worm and checking element about an axis coincident with the axis of an imaginary worm wheel of mating capacity with and positioned in mating relation to said worm; and additional mechanism for effecting simultaneous and time axial rotation of said worm relative to said checking element.

21. Checking mechanism for worms comprising in combination, means for rotatably mounting a worm to be checked; a checking finger; means for pivotally mounting said checking finger for movement into and out of coincidence with a tangent to the base circle of said worm; and means for effecting bodily rotation of said worm and checking finger relative to each other about an axis coincident with the axis of said base circle.

HARRY PELPHREY.